US008498667B2

(12) United States Patent
Chang et al.

(10) Patent No.: US 8,498,667 B2
(45) Date of Patent: Jul. 30, 2013

(54) SYSTEM AND METHOD FOR MIXING AUDIO WITH RINGTONE DATA

(75) Inventors: O-Cheng Chang, San Diego, CA (US); Junyan Bei, Encinitas, CA (US); Karthik Kannan, San Diego, CA (US); Siva Pavan Kumar Mitnala, Hyderabad (IN); Hui-Ya Nelson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 961 days.

(21) Appl. No.: 11/944,193

(22) Filed: Nov. 21, 2007

(65) Prior Publication Data

US 2009/0131119 A1    May 21, 2009

(51) Int. Cl.
*H04M 1/00* (2006.01)

(52) U.S. Cl.
USPC ...................................... 455/556.1; 455/550.1

(58) Field of Classification Search
USPC .................. 455/456, 550.1; 379/156, 142.08, 379/215.01
See application file for complete search history.

(56) References Cited

U.S. PATENT DOCUMENTS

| | | | |
|---|---|---|---|
| 6,011,851 A | 1/2000 | Connor et al. | |
| 6,067,361 A | 5/2000 | Kohut et al. | |
| 6,154,545 A | 11/2000 | Kohut et al. | |
| 6,504,934 B1 | 1/2003 | Kasai et al. | |
| 6,611,603 B1 | 8/2003 | Norris et al. | |
| 6,839,438 B1 | 1/2005 | Riegelsberger et al. | |
| 6,850,496 B1 | 2/2005 | Knappe et al. | |
| 6,882,971 B2 | 4/2005 | Craner | |
| 6,983,251 B1 | 1/2006 | Umemoto et al. | |
| 7,012,630 B2 | 3/2006 | Curry et al. | |
| 7,030,849 B2 | 4/2006 | Au et al. | |
| 7,285,712 B2 | 10/2007 | Hsieh et al. | |
| 2001/0012349 A1* | 8/2001 | Karnowski | 379/156 |
| 2007/0218878 A1* | 9/2007 | Khawand et al. | 455/414.1 |

FOREIGN PATENT DOCUMENTS

| | | |
|---|---|---|
| CN | 1997047 A | 7/2007 |
| EP | 1791336 A2 * | 5/2007 |
| JP | 2006197625 A | 7/2006 |
| TW | 200623823 | 7/2006 |
| WO | WO2005001809 | 1/2005 |
| WO | WO2007143373 | 12/2007 |

OTHER PUBLICATIONS

International Search Report and Written Opinion—PCT/US2008/084400, International Search Authority—European Patent Office—Feb. 23, 2009.
Taiwan Search Report—TW097145208—TIPO—Aug. 14, 2012.

* cited by examiner

*Primary Examiner* — Nizar Sivji
(74) *Attorney, Agent, or Firm* — Espartaco Diaz Hidalgo (57) ABSTRACT

A method and system for played a mixed audio in a communications device during an active communication session is disclosed. One configuration allows for ringtone audio to be heard simultaneously with voice audio received during an on-going phone call. In one configuration, the device comprises a transceiver a transceiver configured to receiver a first audio signal, an event handler configured to receive a notification, a storage configured to store at least one audio file, a processor configured to initiate a conversion of an audio file stored in the storage into a second audio signal, based on the received notification, a mixer configured to mix the first audio signal and the second audio signal to create a mixed audio signal, and an output device to output the mixed audio signal.

29 Claims, 3 Drawing Sheets

SYSTEM AND METHOD FOR MIXING AUDIO WITH RINGTONE DATA

FIELD

The present disclosure relates to audio processing, and more particularly to audio mixing techniques to allow simultaneous playback of at least two audio signals. This disclosure is related to co-pending and co-related patent application Ser. No. 11/449,454 entitled "Intelligent Scaling and Mixing to Differentiate Audio Sources".

DESCRIPTION OF THE RELATED ART

Modern telephone handsets now include advanced music features that allow users to listen to high quality music and also make and receive telephone calls from third parties. Multimedia handset design calls for flexible digital-audio sampling and powerful processing capabilities to enable hi-fi quality audio recording and playback features. Sophisticated audio processing such as multi-band equalization or 3D sound processing, for example, may become necessary to optimize the signal for playback through a speakerphone or headphones.

While current handsets become more and more powerful, users are simultaneously demanding greater flexibility in the use of their handsets. To support these emerging complex use modes, such handheld devices are beginning to require flexible digital and analog interfaces that allow mixing of different content during playback modes. For example, many current phones will pause music or video playback if an incoming telephone call is detected. Other phones will lower the volume of music or video and play a tone to alert the user that a call is incoming. These diverse data streams typically have different sample rates, which adds to the complexity of managing these handset features.

When a cellular phone is idle and receives an incoming call notification, the cellular phone will typically access ringtone data to be played through a speaker of the phone. The ringtone data can be either a simple tone, or a complex musical score and normally is chosen by the user to be both aesthetically pleasing and identifying of the caller. However, when the user of a cellular phone already engaged in conversation on the phone, the ringtone feature is generally absent. A simple tonal sound indicates to the cell phone user that there is an additional incoming call because the cell phone cannot generate complex sounds without affecting the quality of the ongoing conversation.

SUMMARY

One aspect described in this disclosure is a method of playing mixed audio in a communication device during an active communication session, the method comprising receiving a first audio signal from the active communication session, receiving a notification, responsive to the notification, initiating a conversion of a stored audio file into a second audio signal, mixing the first audio signal and the second audio signal to create a mixed audio signal, and outputting the mixed audio signal to an output of the communication device.

Another aspect described in this disclosure is a communications device configured to play mixed audio during an active communication session, the device comprising a transceiver configured to receiver a first audio signal, an event handler configured to receive a notification, a storage configured to store at least one audio file, a processor configured to initiate a conversion of an audio file stored in the storage into a second audio signal, based on the received notification, a mixer configured to mix the first audio signal and the second audio signal to create a mixed audio signal, and an output device to output the mixed audio signal.

One aspect is a method of playing mixed audio in a communication device during an active communication session. This method includes: receiving a first audio signal from the active communication session; receiving a notification; responsive to the notification, initiating a conversion of a stored audio file into a second audio signal; mixing the first audio signal and the second audio signal to create a mixed audio signal; and outputting the mixed audio signal to an output of the communication device.

Another aspect is a communications device configured to play mixed audio during an active communication session. This device includes: a transceiver configured to receiver a first audio signal; an event handler configured to receive a notification; a storage configured to store at least one audio file; a processor configured to initiate a conversion of an audio file stored in the storage into a second audio signal, based on the received notification; a mixer configured to mix the first audio signal and the second audio signal to create a mixed audio signal; and an output device configured to output the mixed audio signal.

Yet another configuration is a communications device configured to play mixed audio during an active communication session, wherein the device has: means for receiving a first audio signal from the active communication session; means for receiving a notification; means for initiating a conversion of a stored audio file into a second audio signal, based on the notification; means for mixing the first audio signal and the second audio signal to create a mixed audio signal; and means for outputting the mixed audio signal to an output of the communication device.

Still another configuration is one or more processor-readable storage devices having processor-readable code, the processor-readable code for programming one or more processors to perform a method of playing audio in a communication device during an active communication session. The storage device is programmed to perform a method of: receiving a first audio signal from the active communication session; receiving a notification; responsive to the notification, initiating a conversion of a stored audio file into a second audio signal; mixing the first audio signal and the second audio signal to create a mixed audio signal; and outputting the mixed audio signal to an output of the communication device.

One additional configuration is a circuit, in a communication device, configured to perform a method of playing audio during an active communication session, the method being: providing a first mixable audio signal; receiving a notification; initiating a conversion of a non-mixable audio file into a second mixable audio signal, based on the received notification; mixing the first mixable audio signal and the second mixable audio signal to create a mixed audio signal; and outputting the mixed audio signal.

DETAILED DESCRIPTION

One configuration is a system and method for playing mixed audio in a communications device during an active communication session. For example, one configuration allows for the playing of a ringtone associated with an incoming call to a user of a cellular telephone while the phone continues to encode and decode voice audio from an already occurring phone conversation. The ringtones can be simple musical notes, or complex pieces of music. As discussed below, other configurations described herein merge the musical data of the ringtone with the ongoing conversation without degrading the quality of the conversation taking place on the communications device.

The communications device may be, as mentioned, a wireless cellular telephone. Additionally, the communications device may be a personal digital assistant (PDA), a personal communicator, a land-line based telephone, or a stereo or portable music-player equipped with communicative abilities. Additionally, a communications device may be a mobile unit using Voice over IP (Internet Protocol), where the mobile unit can be a PDA, mobile phone, laptop, personal computer, etc. Generally, speaking, an active communication session is a data session between two devices, wherein data is being transmitted either to or from a device to another device, e.g., a base station, or another terminal. An active communication session comprises a communication link between the device and another device or system. An example of an active communication session is an on-going phone call in a wireless communication system, for example as a first wireless caller is speaking to a second land-based or wireless caller.

With regard to mixing audio signals, the principle of linear superposition applies, to first order, to acoustic waves. That is, when two sounds are played simultaneously, each creates an acoustic wave and the measured sound at any point in time is more or less equal to the sum of those two waves at that point in time. Thus, it can be said that mixing two sounds results in a single sound which is the sum of the two input sounds. Similarly, the mixing of two audio streams, each of which represents a sound, results in a single audio stream which represents the sum of the two input sounds. Mixing two different audio streams, may involve more than a simple summation, however. For example, in some configurations, it is necessary to first make sure that each audio stream is in a "mixable audio format". Mixable audio formats include data formats in which there exists data representing the underlying acoustic waveform at a series of sampled points in time. One example of such a format is pulse code modulation (PCM). In order to mix two signals, it may be advantageous that the sampled points in time are the same for both signals. This simplifies the summation of the two signals. In order to achieve this effect, it may be necessary to resample one or both of the signals, that is, to calculate that value of the underlying acoustic waveform at a different series of sampled points in time.

Mixing may also include altering one or both audio streams in other ways. For example, it may be necessary to adjust the volume (or amplitude of the underlying waveform) to avoid unpleasant audio effects when the two signals are mixed, such as clipping. It may also be advantageous to alter one or both of the audio streams such that a listener can differentiate the two sounds when hearing the mixed audio stream. For example, one of the audio streams may be attenuated with respect to the other so that the other may be more easily heard. Each of the audio streams may have their balance adjusted so that one is heard in a right earpiece and the other in a left earpiece. Yet another mixing technique is described in U.S. patent application Ser. No. 11/449,454, entitled "Intelligent Scaling and Mixing to Differentiate Audio Sources".

As mixing may include placing each data stream into a mixable format, mixing may include synthesis, decompression, decoding, or other processing of the data stream. One class of non-mixable audio file formats, requiring synthesis to be in condition for mixing, are event-driven file formats such as MIDI (Musical Instrument Digital Interface). The MIDI format was designed for sending music information between electronic music devices such as music synthesizers and PC sound cards. More information on MIDI files can be found on the Internet at MIDI.ORG. MIDI files do not contain digitized sounds, but rather contain a set of digital musical instructions (musical notes) that can be interpreted by a processor, and synthesized into a mixable audio stream. Because the MIDI format only contains instructions, in the form of notes, MIDI files can be extremely small. Audio files stored in the MIDI format normally have the extension .mid or .midi. Other formats that are similar, or incorporate features of MIDI, include the XMF (Extensible Music Format), or SMAF (Synthetic Music Mobile Application Format). Some event-driven formats comprise instructions for playing stored digital audio files at specific times, rather than (or in addition to) instructions for playing notes that must be synthesized at specific times. These digital audio files may include files stored in a mixable audio file format. It is also noted that two event-driven files can be mixed before the synthesis of either into a "mixable audio format" and that synthesis can be accomplished after the mixing.

Another class of non-mixable audio file formats includes compressed audio formats such as MP3, which require processing before output to a mixer or digital-to-analog converter. Yet another class of non-mixable audio file formats includes coded audio formats such as those used in wireless communications applications to transmit voice data, such as EVRC (Enhanced Variable Rate Codec) or GSM (Global System for Mobile Communications).

These non-mixable files are typically convertible into a audio format that is more easily mixed within an electronic device. One such class of mixable formats include PCM (Pulse Code Modulation) and related formats, such as ADPCM (Adaptive PCM), WAV or AIFF (Audio Interchange File Format).

One configuration allows for the conversion of at least two non-mixable audio files into two mixable audio streams, and mixing those audio streams to produce a mixed audio output to a user. This is to be accomplished while maintaining fidelity of the sounds and producing as little temporal delay as possible due to processing. For example, if an incoming call is received during a cellular phone conversation, it would be advantageous to mix the voice data of the conversation with ringtone data associated with the incoming call. The creation of a mixed audio stream preferentially causes little delay in either the conversation or the notification of the incoming call, and similarly results in little distortion in the voice data and ringtone data.

Although one aspect of this disclosure relates to incoming call notifications, a variety of other notifications can be performed using ringtone data as described herein. For example, the announcement of a low battery condition or an incoming text message may be announced during a phone conversation using a specialized ringtone. Notification may even include instruction from a user to play a specific ringtone, or other audio file. For example, if a user is listening to an MP3 file and wishes to peruse his/her current library of ringtones. Another configuration may also fail to include such user-initiated notifications. It should be understood that other configurations may utilize any type of notification that occurs during a phone conversation.

In order to provide ringtone audio when a cellular phone is in use, the processor, in one configuration, synthesizes the ringtone data into a mixable audio signal. This synthesis, as disclosed herein, preferably occurs at the same time as the cellular phone is performing its normal operations in a call, e.g. encoding and decoding voice packets.

Before proceeding, it may be helpful to define some additional terms that will be used while describing configurations of the devices described herein. Accordingly, throughout this detailed description, the following terms shall have the meanings ascribed to them here:

The term "announcement" or "call announcement" means a sensory perceptible occurrence that is performed by a telecommunication device to indicate an incoming call. An announcement could be media file, particular sequence of flashing or steady lights, a vibration, or any other sensory perceptible mechanism.

The term "originating device" means a telecommunications device that originates an outbound call. The term originating device may also be used interchangeably with "calling party" or "originating party."

The term "receiving device" means a telecommunications device that receives an inbound call. The term receiving device may also be used interchangeably with "called party" or "receiving party."

The system is comprised of various modules as discussed in detail below. As can be appreciated by one of ordinary skill in the art, each of the modules may comprise various subroutines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The configurations disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Figure 1:
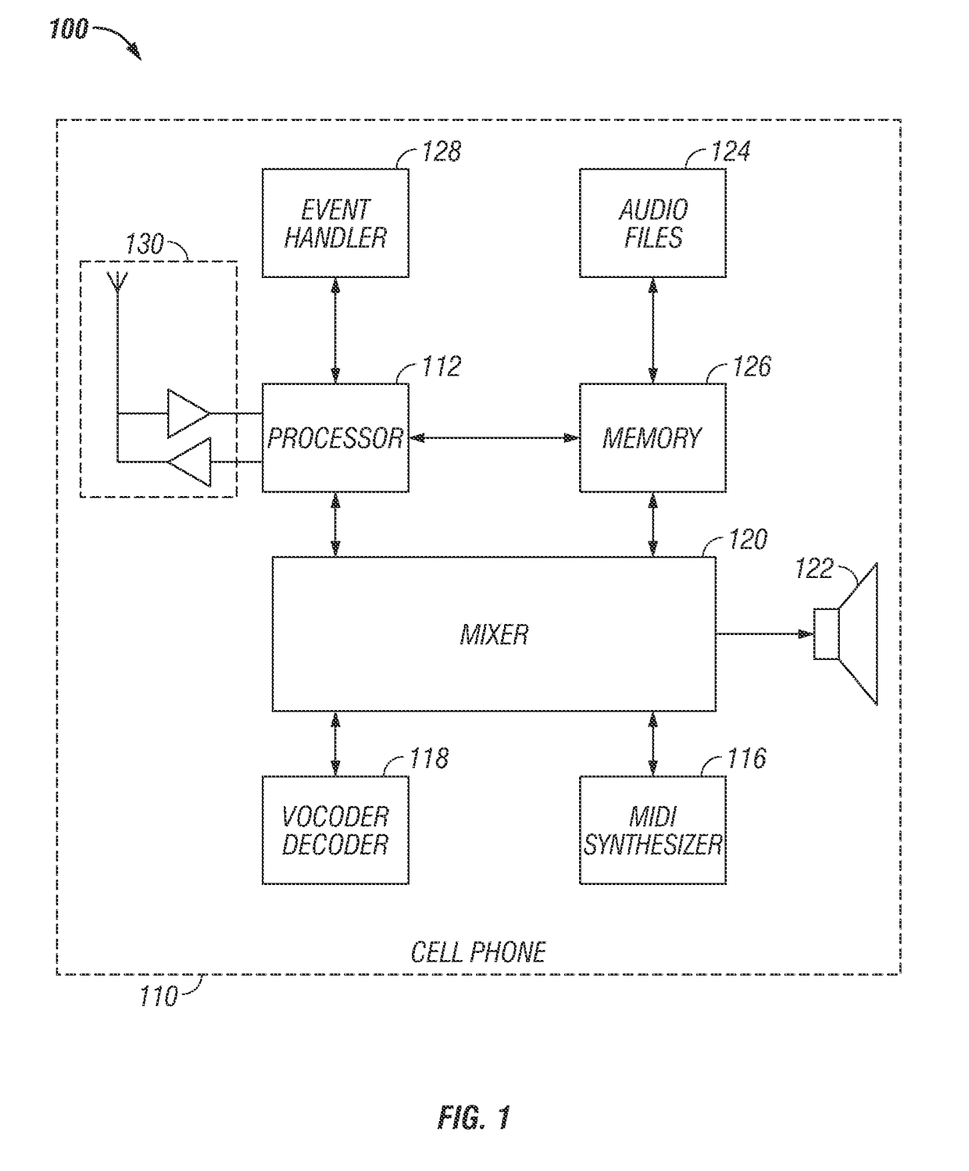
FIG. 1 is a functional block diagram of an exemplary configuration in this disclosure.

FIG. 1 is a functional block diagram of an exemplary configuration of this disclosure. This configuration includes a cell phone 110. The cell phone can be any type of conventional wireless telephone, such as those manufactured by SAMSUNG®, NOKIA®, RESEARCH IN MOTION®, and others. The cell phone comprises, among other things, a transceiver 130, a processor 112, a memory 126, a mixer 120, and a speaker 122. The transceiver 130 is configured to send and receive digital signals. In certain configurations, the transceiver may comprise an antenna for wireless communications. The processor 112 can be any standard or custom-designed microprocessor. In one configuration, the processor comprises a chipset from Qualcomm's MSM (Mobile Station Modem) series, such as MSM 6290 or MSM 6800. More information on these processors can be found on the Internet at qualcomm.com. Coupled to the processor (or, in some configurations, part of the processor) is an event handler 128. The event handler 128 is capable of receiving notification from a user, via a keypad, the processor, the transceiver, or other device capable of sending a notification and generating an event that leads the processor 112 to take a predetermined action. The event handler 128 may be implemented, for example, in software as function calls. The memory 126 can be any type of digital storage, such as a flash memory card or magnetic hard drive. Coupled to the memory (or, in some configurations, stored within the memory) in a bank of audio files 124. The audio files 124 may be stored in a variety of formats, such as those listed above.

The audio files 124 may comprise ringtone data to be played upon the reception of an incoming call notification, handled by the event handler 128. When such an incoming call notification is received, the proper audio file is selected based on criterion selected by the user. For example, a cell phone call from work may be associated with a first ringtone stored as a MIDI file in the bank of audio files 124, whereas a telephone call from a friend may be associated with a second ringtone stored as a WAV files in the bank of audio files 124. The mixer 120 is configured to provide output to speaker 122. The mixer 120 is configured to mix two or more audio streams together, as well as to throughput a single audio stream to the speaker 122. The mixer 120 may be embodied separately or as part of the processor, and the functions it performs may be enabled by software or firmware. In order to mix two audio streams, as mentioned above, the mixer is connected to at least a vocoder decoder 118 and a MIDI synthesizer 116. In some configurations, the vocoder decoder 118 and MIDI synthesizer 116 are part of the mixer 120.

The vocoder decoder 118 is configured to decode voice packets (voice data) associated with a phone call, or active communication session, into a mixable audio format. The vocoder decoder 118 decodes incoming speech from an originating device, such as another cell phone, or a land-line telephone. The MIDI synthesizer 116 is configured to synthesize an audio signal in a mixable audio format based on an input MIDI file. One example of a MIDI synthesizer is the CMX MIDI Synthesizer. Also within the cell phone 110 is a vocoder decoder 118 that decodes incoming speech from an originating device, such as another cell phone, or a land-line telephone. The combined output from the mixer 120, when voice packets and a MIDI file are input, allows a user to hear a MIDI ringtone during a telephone conversation with another party.

Figure 2:
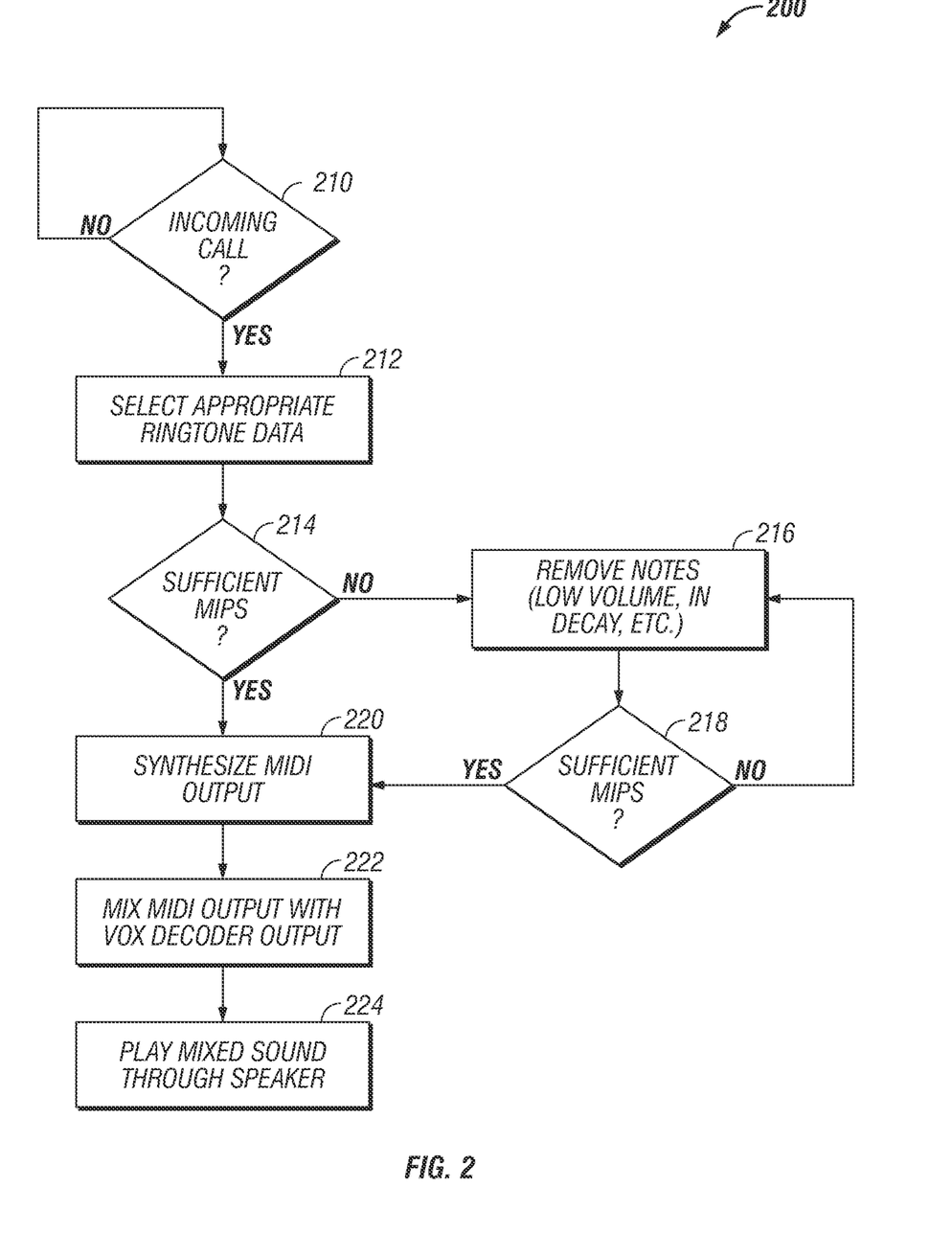
FIG. 2 is a flowchart which shows a method of simultaneous playing a voice signal and a MIDI file.

FIG. 2 is a flowchart which shows a process 200 of simultaneously outputting a voice signal and a MIDI file to a user. The process 200 may occur as a cell phone has a call in process. At a state 210, the processor waits to receive an incoming call notification. If there is no notification of another incoming call, the state 210 continues to loop. Once the cell phone is notified of an incoming call, the proper ringtone data associated with the incoming call is selected from the stored MIDI files at a state 212.

Once the appropriate ringtone data has been selected at the state 212, the process 200 moves to a decision state 220 to determine if there is sufficient processing power available within the cell phone to process voice encoding, voice decoding, and synthesis of the ringtone data. This is discussed more completely with regard to FIG. 3 below. If a determination is made at the decision state 220 that the processor does not have the ability to synthesize the full amount of ringtone data due to a significant amount of processing power being devoted to voice encoding and/or decoding, the ringtone data is modified at a state 216.

In the state 216, the system may reduce the complexity of the ringtone data so that it can be synthesized using fewer processor cycles. This allows the system to maintain the fidelity of the voice encoding and decoding processes, but still play the chosen ringtone to the user. In one configuration, during the state 216, the system removes one or more notes from the ringtone as it is being synthesized by the MIDI synthesizer. As MIDI files are essentially files of the notes that make up the ringtone, it is possible to reduce particular notes from the MIDI file before the file is reconstituted into digital music as a ringtone. Such a reduction is not likely to be noticed by a typical user, as it would only make a very minor alteration of the overall sound of the ringtone.

In one configuration, the order of note removal is based on limiting the perceived effect to the user of removing the notes. Removing notes that are lower in volume, for example, would make less of an effect for the listener, as the listener would not miss the quieter notes as much as relatively louder notes. Another option for reducing the complexity of the ringtone is by removing and, thus, not synthesizing, notes that are in the "release portion". Any particular note or tone may have several states in a ringtone. Initially, a note may be in an "initial" portion for a specific period of time. The note then moves from the initial portion to a "sustain" portion for a predetermined period of time. This is followed by the release portion of the note. Because the release portion may be quieter and less important to the overall composition of the ringtone than the other portions, reducing the duration of the release portion of a note may not be noticeable to a user.

Still other methods of reducing the complexity of ringtone data are anticipated. For example, certain MIDI tracks, such as the melody, may be given a higher priority than other tracks. As is known, the melody of a ringtone is a linear succession of musical events, as opposed to one time events, such as a chord or harmony. Accordingly the melody may be synthesized with higher fidelity than the harmony without destroying the perceived sound of the ringtone. Accordingly, in one configuration, notes from the harmony or specific chords are removed in order to reduce complexity of the ringtone, while notes within the melody track are unaltered.

Once the system reduces the complexity of the music by one of the methods described above, the process 200 moves to a decision state 218 wherein a determination is made whether the file has been reduced a sufficient amount to allow the processor to synthesize the ringtone and also decode and encode the voice signal of the ongoing telephone call. If a determination is made that there are not sufficient MIPS (millions of instructions per second, a measure of processing power) left to decode and encode the voice signal with high fidelity, the process 200 returns to state 216 where additional methods are undertaken to reduce the complexity of the ringtone. However, if a determination is made that there are sufficient MIPS left within the handset to decode and encode voice and also synthesize the ringtone, the process 200 moves to a state 220 wherein the ringtone is synthesized.

Once the ringtone data has been synthesized into an audio signal at the state 220, the resulting audio signal is mixed with the output audio signal received from the vocoder decoder 222. In order to mix the audio signals received from the MIDI synthesizer with the voice data from the vocoder decoder, it may be advantageous to resample each data stream to have the same sampling frequency. In one configuration, the voice and the ringtone audio signal are sampled at 48 kHz. Of course, the system is not limited to sampling at any particular frequency. The mixed sound is then played through the speaker of the cell phone 224.

Figure 3:
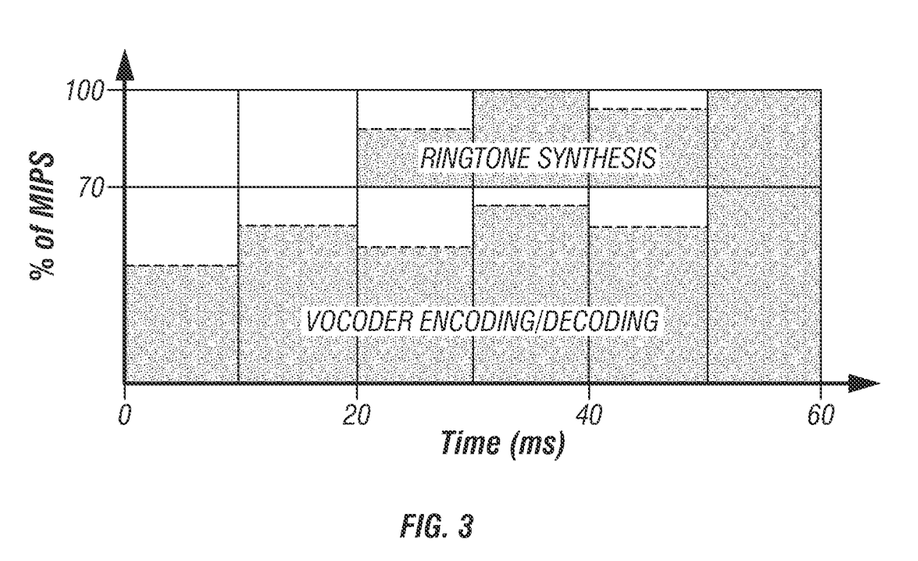
FIG. 3 is a diagram showing the allocation of processing power over a time period.

FIG. 3 is a diagram showing the allocation of processing power in a handset over a 60 millisecond time period wherein the user is on a telephone call, and a ringtone is also attempting to play during the same period, thus notifying the user of an incoming call. During a cell phone conversation, the processor is responsible, among other things, for voice encoding, voice decoding, and ringtone synthesis. During a particular phone call, the maximum amount of chip/microprocessor/computer processing power the voice encoding/decoding can use normally depends on the particular codec being processed. The amount of this maximum in use at any given time depends on the signal actually being encoded or decoded. For example, encoding/decoding silence takes very little processing power. In FIG. 3, an exemplary codec which may require 70% of the processing power is used to encode and decode voice signals during a telephone call. This 70% of processing power is dedicated to voice encoding/decoding while this codec is in use. The remaining processing power is thus available for ringtone synthesis in the case a notification is received.

The percentage of processing power a codec may require can, of course, be numbers other than 70%, and it is anticipated that, in one configuration the processing power may be allocated dynamically according to the codec in use. In the example shown in FIG. 3, between 0 ms and 10 ms, approximately half of the dedicated processing power is used for vocoder operation. At the end of the 10 ms, the voice decoding has converted received non-mixable voice packets into a mixable audio format that can be fed to a digital-to-analog converter and played through a speaker. At the end of the 10 ms, the decoded audio is played to a user of the telephone. While this audio is being played, in the next 10 ms, the vocoder requires approximately three-quarters of the dedicated processing power to perform voice packet encoding and decoding. At the end of the next 10 ms, the non-mixable voice packets are decoded into a mixable audio format and played to the user. Thus, between 0 and 20 ms, the processor fully encodes and decodes the voice signals from the telephone conversation. At approximately 20 ms, an incoming call notification is received, prompting the processor to select appropriate ringtone data and begin synthesizing it into a mixable audio signal. Thus the system begins to perform 10 ms of both voice encoding/decoding and MIDI synthesis. Again, 100% of the processing power dedicated to vocoder operation is not used, and, in this case, 100% of the remaining processing power for ringtone synthesis is not used. Because the first 10 ms of MIDI ringtone data can be synthesized within the available MIPS from the processor, it is not necessary to take any steps to reduce the complexity of the ringtone. At the end of this 10 ms time period, the non-mixable voice packets have been converted to a mixable audio stream, and the non-mixable ringtone data has been synthesized into a mixable audio stream. These two streams are mixed and played with as little delay as possible. Thus, while the next portion of the ringtone data is being synthesized over the next 10 ms, the mixed audio stream comprising voice and ringtone audio is being played to the user. Over the next 10 ms, between 30 ms and 40 ms, much of the dedicated vocoder processing power is in use, and ringtone synthesis continues to occur. In this case, however, the ringtone data was too complex to be fully synthesized with the available processing power.

The available processing power is used to synthesize 10 ms of ringtone data as faithfully as possible. As discussed above, the system may reduce the complexity of the ringtone by one or more of the methods described above, rather than simply synthesizing, e.g., the first 5 ms of the ringtone portion. For example, by removing notes from the data input into the MIDI synthesizer, less processing power is necessary to synthesize the data into an audio signal. As discussed above, the order of note removal is based on limiting the perceived effect of dropping the notes. It should be realized that in one configuration the system continues reducing complexity so that the timing of the ringtone is not impaired by the ongoing telephone conversation. Thus, while the ringtone may be reduced in complexity, it is not synthesized to have gaps or jumps in the musical composition. The composition still plays in its normal time period, it may just be more or less reduced in complexity depending on how busy the processor is at encoding and decoding voice data. This assures that the ringtone maintains the same sound as expected by the user, without skips or noise.

The reduction in complexity of the ringtone data is performs in any of a number of ways. In one configuration, all notes that would be synthesized at a given time if processing power was available are stored in a memory, wherein each note is given an "Active" attribute set either on or off. To reduce complexity, one needs simply to change the "Active" attribute off. The MIDI synthesizer would be programmed to only synthesize those notes with the "Active" attribute set to on.

Figure 4:
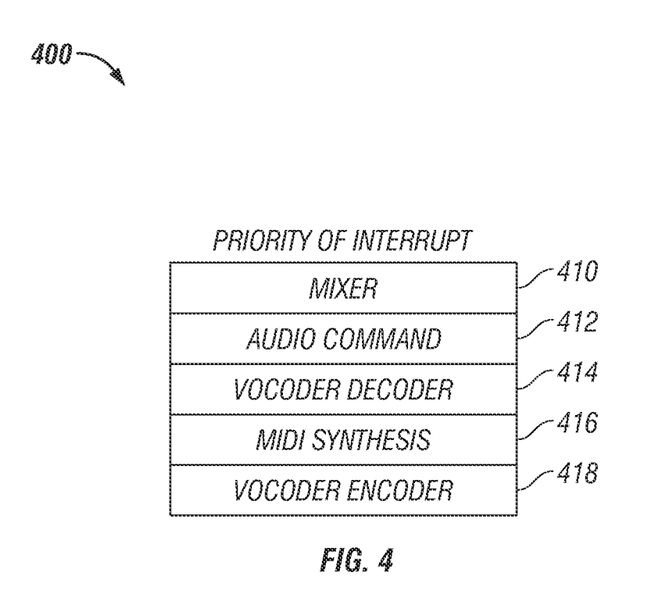
FIG. 4 is a diagram showing the priority of interrupt according to one configuration in this disclosure.

FIG. 4 is a diagram showing the priority of interrupt according to one configuration. Considering priorities among the mixer 410, audio command 412, vocoder decoder 414, MIDI synthesizer 416, and vocoder encoder 418, the mixer 410 has the highest priority to ensure noise-free playback. Secondly, the audio command 412 has the second priority since it is short and, in some configurations, the host processor requires a fast response. Thirdly, the vocoder decoder 414 has the third priority since its timing constraint may be strict. The MIDI synthesizer 416 has the fourth priority because its 10 ms time resolution is finer than the vocoder encoder's 20 ms frame. The MIDI synthesizer is designed to not consume more than the pre-allocated processing power. Otherwise, the vocoder encoder output may deteriorate.

The vocoder encoder 418 has the lower priority. Finally, an idle loop may be advantageous in the top-level code since all processing is interrupt-driven. In the case MIDI synthesis is supported by hardware, there may be an additional MIDI hardware ISR. The priority of the MIDI hardware may be the same as the audio command to achieve maximum utilization of MIDI hardware. The interrupts serve to prioritize the order in which the processor executes given commands serials. For instance, if the processor is encoding voice packets using the vocoder encoder and it suddenly receives instruction to begin MIDI synthesis, it may perform the MIDI synthesis (as it's interrupt priority is higher), before returning to finish encoding the voice packets using the vocoder encoder.

As mentioned above, one configuration is a method of playing mixed audio in a communication device during an active communication session, the method comprising receiving a first audio signal from the active communication session, receiving a notification, responsive to the notification, initiating a conversion of a stored audio file into a second audio signal, mixing the first audio signal and the second audio signal to create a mixed audio signal, and outputting the mixed audio signal to an output of the communication device. Structure for performing the steps of this method have been described above. Additional means for performing the steps are discussed below. The step of receiving a first audio signal from the active communication session may be performed by the transceiver 130. The transceiver 130 may include an antenna for receiving wireless signals, or a wired connection to a public data network, such as the Internet. The processor 112 may also receive a first audio signal, for example, via the transceiver 130. The step of receiving a notification may be performed by the event handler 128. For example, when battery of a cellular phone is low, the processor 112 may generate a notification to the event handler 128, which in turn instructs the processor 112 to select an appropriate audio file from the memory 126 or bank of audio files 124. The processor 112 may also receive a notification, for example, from the event handler, or via the transceiver 130. The step of initiating a conversion of a stored audio file into a second audio signal may be performed by the processor 112 as it loads an audio file from the memory 126 or bank of audio files 124. The memory 126 may also perform initiating a conversion as it transmits a second audio signal to the processor 112, mixer 120, or MIDI synthesizer 116 in response to instruction from the processor 112 or event handler 128. The step of mixing the first audio signal and the second audio signal may be performed by the mixer 120. Additionally, this step may be performed by the processor 112. In the case of mixing two event-driven audio signals, such as two MIDI files, the MIDI synthesizer 116 may be capable of performing the mixing. The step of outputting the mixed audio signal to an output of the communication device may be performed by the mixer 120. The output device of the communication device may be a speaker 122, or the transceiver 130. In the case that the output device is the transceiver 130, the processor 112 may be capable of performing the outputting step. In a configuration where the output device is an antenna, the transceiver 130 may perform the outputting step. The processor 112 may perform the outputting step in a configuration where the mixer 120 feeds the mixed audio signal to the processor 112 for further processing, such as digital-to-analog conversion before output to a speaker.

It should be noted that a person having ordinary skill in the art will recognize that a circuit may implement some or all of the functions described above. There may be one circuit that implements all the functions. There may also be multiple sections of a circuit in combination with a second circuit that may implement all the functions. In general, if multiple functions are implemented in the circuit, it may be an integrated circuit. With current mobile platform technologies, an integrated circuit may comprise at least one digital signal processor (DSP), and at least one ARM processor to control and/or communicate to the at least one DSP. A circuit may be described by sections. Often sections are re-used to perform different functions.

A circuit, in a communication device, may be configured to provide a first mixable audio signal. The same circuit, a different circuit, or a second section of the same or different circuit may be configured to receive a notification. In addition, the same circuit, a different circuit, or a third section of the same or different circuit may be configured to initiate a conversion of a non-mixable audio file into a second mixable audio signal, based on the received notification. The portion of the circuit configured to initiate a conversion may be coupled to the portion of the circuit that receives the notification, or it may be the same circuit. A fourth section of the same or a different circuit may be configured to mix the first mixable audio signal and the second mixable audio signal to create a mixed audio signal. The fourth section may advantageously be coupled to the first section and the fourth section to obtain the first and second mixable audio signals. Alternatively, the first, third, and fourth sections may be embodied in the same circuit. A fifth section of the same or a different circuit may be configured to output the mixed audio signal.

The fifth section may advantageously be coupled to the fourth section, or it may be embodied in the same circuit as the fourth section.

The foregoing description sets forth various preferred configurations and other exemplary but non-limiting configurations. The description gives some details regarding combinations and modes of the disclosed configurations. Other variations, combinations, modifications, modes, and/or applications of the disclosed features and aspects of the configurations are also within the scope of this disclosure, including those that become apparent to those of skill in the art upon reading this specification. Thus, the scope of what is claimed herein should be determined only by a fair reading of the claims that follow.

What is claimed is:

1. A method of playing mixed audio in a communication device during an active communication session, the method comprising:
   receiving a first audio signal from the active communication session;
   receiving a non-audio notification;
   determining whether the communication device has sufficient processing resources to process a stored audio file and one or more audio signals from the active communication session, including the first audio signal;
   if the communication device lacks sufficient processing resources to process the audio signals from the active communication session and the stored audio file, modifying the stored audio file;
   responsive to the notification, initiating a conversion of the stored audio file into a second audio signal;
   mixing the first audio signal and the second audio signal to create a mixed audio signal; and
   outputting the mixed audio signal to an output of the communication device.

2. The method of claim 1, wherein the first audio signal comprises voice data.

3. The method of claim 1, wherein the notification comprises a notification of an incoming call.

4. The method of claim 1, wherein the communication device comprises a telephone and the active communication session comprises an on-going telephone call.

5. The method of claim 1, wherein the communication device is a wireless cellular phone.

6. The method of claim 1, wherein the stored audio file comprises ringtone data.

7. The method of claim 1, wherein the stored audio file comprises a file stored in an event-driven audio format.

8. The method of claim 7, wherein the event-driven audio format comprises a MIDI component.

9. The method of claim 1, wherein the mixing comprises altering the audio perception characteristics of at least one of the audio signals.

10. The method of claim 1, wherein the mixing comprises resampling at least one of the mixable audio files.

11. The method of claim 1, wherein the mixing comprises synthesis, decompression, or decoding.

12. A communications device configured to play mixed audio during an active communication session, the device comprising:
   a transceiver configured to receive a first mixable audio signal;
   an event handler configured to receive a non-audio notification;
   a storage configured to store a plurality of audio files;
   a processor configured to select a non-mixable audio file from the plurality of audio files, the non-mixable audio file corresponding to the received notification, and to initiate a conversion of the non-mixable audio file into a second mixable audio signal, based on the received notification;
   a mixer configured to mix the first mixable audio signal and the second mixable audio signal to create a mixed audio signal; and
   an output device configured to output the mixed audio signal.

13. The device of claim 12, wherein the communications device comprises a telephone and the active communication session comprises an on-going telephone call.

14. The device of claim 13, wherein the telephone comprises a wireless cellular telephone.

15. The device of claim 12, wherein the output device is a speaker.

16. The device of claim 12, wherein at least two of the processor, event handler, and mixer are embodied in the same unit.

17. The device of claim 12, wherein the processor is further configured to decode received voice data to provide the first mixable audio signal.

18. The device of claim 12, wherein the notification is produced by the processor.

19. The device of claim 12, wherein the notification comprises an incoming call notification.

20. The device of claim 12, wherein the audio file comprises ringtone data.

21. The device of claim 12, wherein the mixer is configured to resample at least one of the mixable audio signals.

22. The device of claim 12, wherein at least one of the mixer and the processor are configured to perform synthesis, decompression, or decoding.

23. A communications device configured to play mixed audio during an active communication session, the device comprising:
   means for receiving a first audio signal from the active communication session;
   means for receiving a non-audio notification;
   means for determining whether the communication device has sufficient processing resources to process a stored audio file and one or more audio signals from the active communication session, including the first audio signal;
   means for modifying the stored audio file, if the communication device lacks sufficient processing resources to process the audio signals from the active communication session and the stored audio file;
   means for initiating a conversion of a stored audio file into a second audio signal, based on the notification;
   means for mixing the first audio signal and the second audio signal to create a mixed audio signal; and
   means for outputting the mixed audio signal to an output of the communication device.

24. One or more processor-readable storage devices having processor-readable code, the processor-readable code for programming one or more processors to perform a method of playing audio in a communication device during an active communication session, the method comprising:
   receiving a first audio signal from the active communication session;
   receiving a non-audio notification;
   determining whether the communication device has sufficient processing resources to process a stored audio file and one or more audio signals from the active communication session, including the first audio signal;

if the communication device lacks sufficient processing resources to process the audio signals from the active communication session and the stored audio file, modifying the stored audio file;

responsive to the notification, initiating a conversion of the stored audio file into a second audio signal;

mixing the first audio signal and the second audio signal to create a mixed audio signal; and outputting the mixed audio signal to an output of the communication device.

25. The one or more processor-readable storage devices of claim 24, wherein said active communication session comprising an on-going telephone call.

26. The one or more processor-readable storage devices of claim 24, wherein said notification comprises a notification of an incoming telephone call.

27. A circuit, in a communication device, configured to perform a method of playing audio during an active communication session, the method comprising:

providing a first mixable audio signal;

receiving a non-audio notification;

selecting a non-mixable audio file from the plurality of non-mixable audio files, the non-mixable audio file corresponding to the received notification;

initiating a conversion of the non-mixable audio file into a second mixable audio signal, based on the received notification;

mixing the first mixable audio signal and the second mixable audio signal to create a mixed audio signal; and outputting the mixed audio signal.

28. The circuit of claim 27, wherein said first mixable audio signal comprises decoded voice data.

29. The circuit of claim 27, wherein receiving said notification comprises receiving notification of an incoming telephone call.

* * * * *